(12) United States Patent
Kim

(10) Patent No.: US 11,075,413 B1
(45) Date of Patent: Jul. 27, 2021

(54) SOLID-STATE BATTERY AND METHOD OF FORMING SAME

(71) Applicant: WATTRII INC., San Marcos, TX (US)

(72) Inventor: Jangwoo Kim, Kyle, TX (US)

(73) Assignee: WATTRII Inc., San Marcos, TX (US)

( * ) Notice: Subject to any disclaimer, the term of this patent is extended or adjusted under 35 U.S.C. 154(b) by 0 days.

(21) Appl. No.: 17/122,462

(22) Filed: Dec. 15, 2020

(51) Int. Cl.
  *H01M 10/00*  (2006.01)
  *H01M 10/44*  (2006.01)
  *H01M 4/66*   (2006.01)

(52) U.S. Cl.
  CPC ......... *H01M 10/445* (2013.01); *H01M 4/662* (2013.01)

(58) Field of Classification Search
  CPC ....... Y02E 60/10; H01M 10/34; H01M 10/44; H01M 50/1385; H01M 12/06
  See application file for complete search history.

(56) References Cited

U.S. PATENT DOCUMENTS

| 2011/0195320 A1* | 8/2011 | Nishikoori | H01M 10/34 429/403 |
| 2013/0266859 A1* | 10/2013 | Todoriki | H01M 4/625 429/211 |
| 2019/0319258 A1* | 10/2019 | Lee | H01M 4/13 |
| 2019/0372149 A1* | 12/2019 | Cho | H01M 50/409 |
| 2020/0006731 A1* | 1/2020 | Tokuno | H01M 50/449 |

* cited by examiner

*Primary Examiner* — Cynthia H Kelly
*Assistant Examiner* — Monique M Wills
(74) *Attorney, Agent, or Firm* — Snell & Wilmer L.L.P.

(57) ABSTRACT

Methods of forming an electrochemical cell using a non-inert gas are disclosed. Exemplary methods include providing a non-inert gas before and/or after at least one charge and/or discharge cycle. The non-inert gas can facilitate formation of a solid electrolyte interphase (SEI). Further examples of the disclosure relate to methods of forming an electrochemical cell or portion thereof by electrospraying a solution including polymeric material. Such methods potentially eliminate a step of compressing the cell at a pressure beyond 100 MPa and prolong the cycle life while preventing a fire hazard.

20 Claims, 13 Drawing Sheets

SOLID-STATE BATTERY AND METHOD OF FORMING SAME

TECHNICAL FIELD

The present disclosure relates generally to solid-state batteries and to methods of forming the batteries. More specifically, examples of the disclosure relate to methods of forming solid-state batteries using a non-inert gas. Further examples of the disclosure relate to methods of forming batteries or components thereof using an electrospraying process to create a thin polymeric film that may advantageously suppress dendritic growth during the useful life of the battery.

BACKGROUND

Batteries are in high demand for a wide range of applications, from small batteries for industrial and medical devices, to larger batteries for electric vehicles and grid energy storage systems. Well-known and widely used batteries include lithium-ion batteries.

Lithium-ion batteries generally include one or more electrochemical cells, wherein each electrochemical cell includes an anode, a cathode, an (e.g., liquid) electrolyte, and often a separator between the anode and the cathode. During discharge of the battery, lithium ions carry current from an anode to a cathode and through the electrolyte of the electrochemical cell. To recharge the battery, an external current source of sufficient bias is applied to the battery to cause the lithium ions to flow in a reverse direction—from the cathode to the anode and to redeposit on the anode or a substrate. Typical lithium-ion electrochemical cells include at least one electrode that uses intercalation to add lithium.

Although typical lithium-ion batteries work well for several applications, there is a demand for batteries with higher energy density, increased charging rate, lower cost of materials, and reduced safety hazards—e.g., reduced flammability. Accordingly, improved lithium-ion cells, components of the cells, batteries including the cells, and methods of forming and using the cells and batteries are desired.

Any discussion, including discussion of problems and solutions, set forth in this section has been included in this disclosure solely for the purpose of providing a context for the present disclosure. Such discussion should not be taken as an admission that any or all of the information was known at the time the invention was made or otherwise constitutes prior art.

SUMMARY

The present disclosure generally relates to solid-state electrochemical cells and batteries and to methods of forming the cells and batteries. Examples of the disclosure provide a solid-state battery with a solid-state electrolyte that advantageously provides low interfacial resistance, which is similar to that of lithium-ion batteries formed using a conventional liquid electrolyte. Use of a solid, rather than a liquid, electrolyte can reduce safety hazards, such as potential fire hazards associated with use or storage of the batteries. Additionally, or alternatively, use of the solid electrolyte can prolong a cycle life of a battery.

In accordance with various examples of the disclosure, a method of forming an electrochemical cell and/or battery includes providing a non-inert gas. The non-inert gas can include at least one oxygen atom. The non-inert gas can be provided while forming the battery and/or to displace all or a portion of the gas that may be present within the battery—e.g., after one or more charge and/or discharge cycles. Advantageously, the solid-state batteries produced in accordance with the exemplary embodiments exhibit an improvement in the interfacial ionic conductivities, which can lead to an improvement in specific capacity, rate capability, cycle life, energy density, power density, self-discharge rate, charging speed and low- and high-temperature performance.

In accordance with further examples of the disclosure, a method of forming an electrochemical cell includes providing a housing, providing a first electrode within the housing, providing a solid-state electrolyte in contact with the first electrode and within the housing, providing a substrate within the housing, providing a first non-inert gas to the housing to displace ambient gas within the housing, and sealing the housing. Exemplary methods can further include a step of forming a solid electrolyte interphase (SEI) between the solid-state electrolyte and one or more of the first electrode and a second electrode. For example, the non-inert gas can be used during one or more steps of charging the electrochemical cell and discharging the electrochemical cell. Gas formed during the one or more steps of charging the electrochemical cell and discharging the electrochemical cell can be purged with the non-inert gas, another (e.g., second) non-inert gas and/or an inert gas. Methods can further include one or more second and/or additional steps of charging the electrochemical cell and discharging the electrochemical cell that can be performed after the purge step.

In accordance with additional examples of the disclosure, an electrochemical cell is provided. The electrochemical cell can be formed using, for example, a method as described herein.

In accordance with yet further examples of the disclosure, a battery is provided. The battery can include an electrochemical cell as described herein and/or be formed according to a method described herein. By way of examples, a battery can include a non-inert gas, such as a gas comprising at least one oxygen atom. In accordance with various aspects of these embodiments, the non-inert gas is not intended to be used as an active material. The non-inert gas can be consumed or dissolved to less than 0.01 mg per 1 mAh on average during the full lifecycle of the battery. As used herein, the term "full lifecycle of the battery" is intended to mean that the life of the battery is considered to have exceeded its normal useful life, which can be when the battery exhibits 80% of its original capacity for the first time. The battery can also include a cathode that may comprise a halogenated compound and/or an electroactive aromatic organic compound as a cathode material. The non-inert gas can be in contact with the cathode and the electrolyte. The battery may also include a plasticizer as part of the electrode and electrolyte material. Additionally or alternatively, the battery can include an electrosprayed polymeric material as described herein.

In accordance with further examples of the disclosure, a method of forming a solid-state electrochemical cell or portion thereof includes providing a substrate, such as a current collector, forming a solution comprising polymeric material, and electrospraying the solution onto the substrate.

In accordance with yet other embodiments, a battery includes an electrolyte comprising an electrosprayed polymeric material. The polymeric material can have an ionic conductivity of less than $10^{-6}$ S/cm or less than $10^{-7}$ S/cm. A weight percentage of the polymeric material over the electrolyte can be greater than 0 and less than 5%. Additionally or alternatively, a cathode can include an electrosprayed polymeric material. The battery may also include a plasticizer as part of the electrode (e.g., cathode) and/or electrolyte material.

According to another exemplary embodiment, a method of fabricating a battery includes forming a battery stack comprising a cathode comprising a cathode active material incorporated onto an electrically conductive material, and an electrolyte positioned in and on the cathode. The method also includes introducing the non-inert gas into the battery stack. The electrolyte is in contact with the cathode and the gas. The battery may perform at least one charge and/or discharge operation under the gas at a current density of greater than 0 and less than 0.1 $mA/cm^2$.

According to another exemplary embodiment, a method of fabricating a battery includes forming a battery stack in the non-inert gas filled atmosphere. The battery includes a cathode comprising a cathode active material incorporated onto an electrically conductive material, and an electrolyte positioned in and on the cathode. The electrolyte is in contact with the cathode and the gas. The battery may perform at least one charge and/or discharge operation under the gas at a current density of greater than 0 and less than 0.1 $mA/cm^2$.

In other embodiments and aspects, the battery may include an anode that comprises a material selected from the group consisting of lithium, sodium, potassium, magnesium, calcium, vanadium, aluminum, zinc, silicon, graphite, graphene, porous carbon, activated carbon, a form of silicon, a metal oxide and combinations thereof.

In other embodiments and aspects, the electrically conductive material comprises a porous carbon material selected from the group consisting of carbon black, carbon nanotubes, carbon nanofibers, carbon dots, activated carbon, amorphous carbon, microporous carbon, mesoporous carbon, porous carbon, graphite, graphene, graphene oxide, graphene nanoribbons, nitrogen doped carbon, nitrogen doped graphene, nitrogen doped graphene oxide and combinations thereof.

In further aspects and embodiments, the porous carbon is in the form of particles, powders, paper, foam, fibers, sheets, discs, rods, and/or foils.

These and other embodiments will become readily apparent to those skilled in the art from the following detailed description of certain embodiments having reference to the attached figures; the invention not being limited to any particular embodiment(s) disclosed.

BRIEF DESCRIPTION OF THE FIGURES

A more complete understanding of exemplary embodiments of the present disclosure can be derived by referring to the detailed description and claims when considered in connection with the following illustrative figures.

Figure 1:
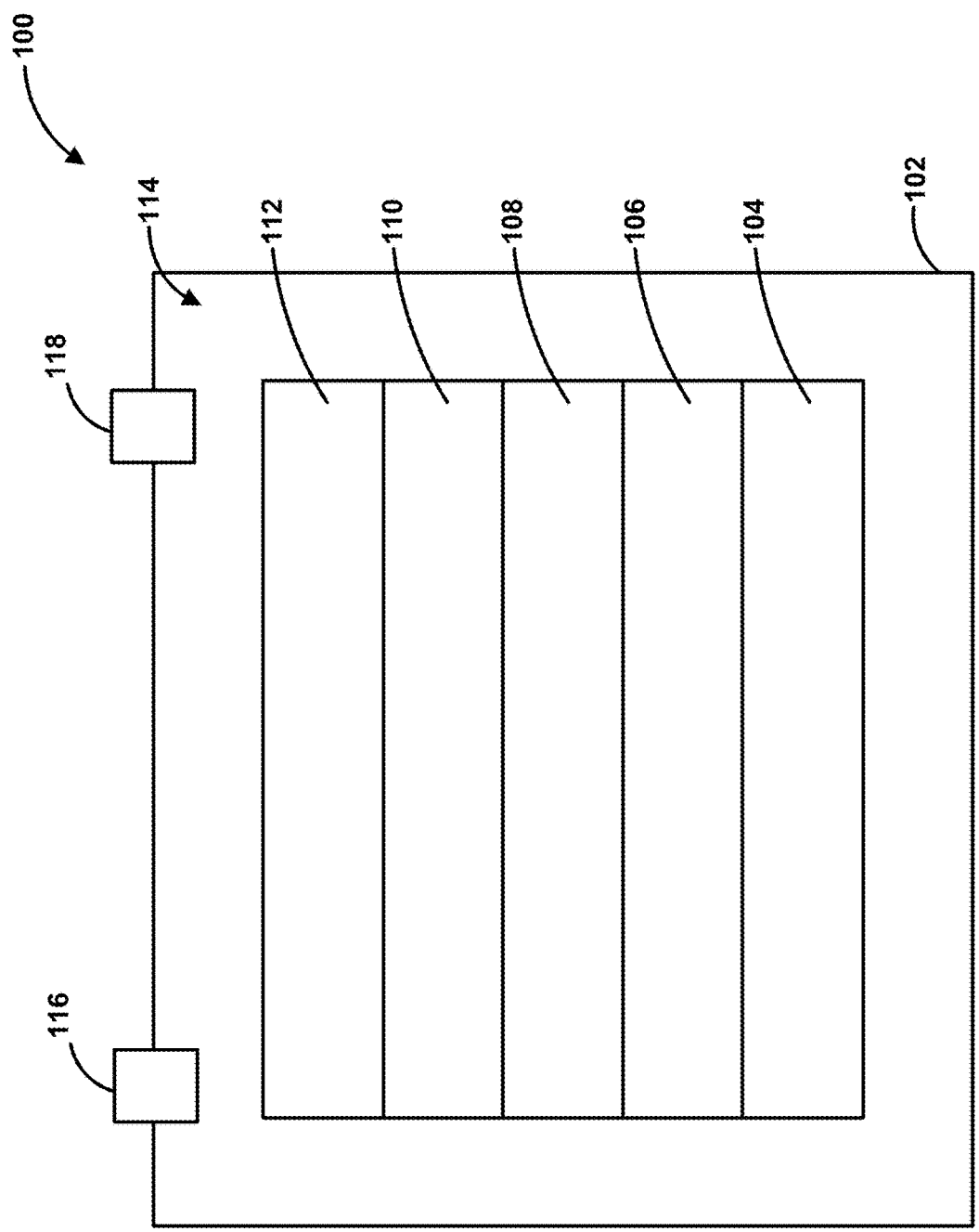
FIG. 1 illustrates a battery according to at least one exemplary embodiment of the disclosure.

It will be appreciated that elements in the figures are illustrated for simplicity and clarity and have not necessarily been drawn to scale. For example, the dimensions of some of the elements in the figures may be exaggerated relative to other elements to help improve understanding of illustrated embodiments of the present disclosure.

DETAILED DESCRIPTION

Although certain embodiments and examples are disclosed below, it will be understood by those in the art that the invention extends beyond the specifically disclosed embodiments and/or uses of the invention and obvious modifications and equivalents thereof. Thus, it is intended that the scope of the invention disclosed should not be limited by the particular disclosed embodiments described below.

The present disclosure relates to batteries and methods of producing batteries that address various shortcomings of traditional lithium-ion batteries. The batteries described according to the various exemplary (and non-limiting) examples herein provide several advantages. For example, exemplary batteries exhibit one or more of: higher energy density, higher power density, longer cycle life, enhanced safety, and enhanced low temperature performance, compared to other lithium-ion batteries, and particularly to other solid-state lithium-ion batteries.

In this disclosure, "gas" can include material that is a gas at normal temperature and pressure (NTP), a vaporized solid and/or a vaporized liquid, and can be constituted by a single gas or a mixture of gases, depending on the context.

As used herein, the term "non-inert gas" refers to a gaseous material excluding an inert gas. An inert gas is a gas that does not take part in a chemical reaction to an appreciable or measurable extent. An inert gas can include, for example, nitrogen, helium, neon, argon, krypton, xenon, radon, or any combination thereof.

As used herein, the term "plasticizer" refers to a material that is added to an organic or polymeric material to make it softer, more flexible, and/or to increase its plasticity. Exemplary plasticizers include, by way of non-limiting example, succinonitrile, glutaronitrile, adiponitrile, ethylene carbonate, propylene carbonate, dimethylformamide, dimethyl sulfoxide, γ-butyrolactone, sulfolane, 3-methyl-2-oxazolidinone, butylene carbonate, phthalate derivatives, trimellitates, adipates, sebacates, maleates, or any combination thereof.

As used herein, the term "cathode" refers to an electrode of a battery cell that receives electrons from an external circuit and is reduced during discharging, and transfers electrons to an external circuit through oxidation during charging. A cathode can be referred to as a positive electrode. In the batteries discussed herein with respect to the various exemplary embodiments, a cathode can include cathode material that is a halogenated compound and/or an electroactive organic compound, such as an aromatic compound described herein. Particular exemplary cathode materials include truxenone, truxenone derivatives, phenoxazine, phenoxazine derivatives, phenothiazine, phenothiazine derivatives, quinone, quinone derivatives, diamine derivatives, phenazine, phenazine derivatives, quinoxaline, quinoxaline derivatives, pyrazine, pyrazine derivatives, cyclohexane, cyclohexane derivatives, triazine, triazine derivatives, melamine, melamine derivatives, and any combination thereof.

As used herein, the term "anode" refers to an electrode of a battery cell that transfers electrons to an external circuit through oxidation during discharging, and receives electrons from an external circuit and is reduced during charging. An anode can be referred to as a negative electrode.

As used herein, the term "electrolyte" refers to a material that provides for ion transport of a battery cell. An electrolyte acts as a conduit for ion transport through its interaction with the anode and the cathode. Upon battery charging, an electrolyte facilitates the movement of ions from the cathode to the anode, whereas upon discharge, the electrolyte facilitates the movement of ions from the anode to the cathode. In rechargeable batteries, the electrolyte promotes ion cycling between the anode and the cathode.

As used herein, the term "current collector" is used to refer to the component that is typically adjacent to the positive or the negative electrode. In some embodiments, the current collector comprises an electrically-conductive material. In some embodiments, the current collector comprises a metal alloy having at least one material selected from the group consisting of molybdenum, titanium, zirconium, and combinations thereof.

As used herein, the term "electrospraying," also known as electrospinning, is used to refer to the thin film production method which uses electric force to draw charged threads of organic solutions or organic melts. An electrospraying method, as described herein, may advantageously allow for the elongation and the thinning of an organic material coated onto a substrate.

As used herein, the term "substrate" can refer to any underlying material or materials upon which another material can be deposited. A substrate can include, for example, a current collector, a current collector and electrode material, and/or a current collector and an electrolyte.

Additionally, any values of variables indicated (regardless of whether they are indicated with "about" or not) may refer to precise values or approximate values and include equivalents, and may refer to average, median, representative, majority, or the like. Further, in this disclosure, the terms "including," "constituted by" and "having" can refer independently to "typically or broadly comprising," "comprising," "consisting essentially of," or "consisting of" in some embodiments. In this disclosure, any defined meanings do not necessarily exclude ordinary and customary meanings in some embodiments.

Turning now to the figures, a battery 100 in accordance with various examples of the disclosure is illustrated in FIG. 1. Battery 100 includes a housing 102, a cathode current collector 104, cathode material 106, an electrolyte 108, anode material 110, an anode current collector 112, and gas 114. Battery 100 can be or include a solid-state lithium-ion battery. Although not separately illustrated, battery 100 can also include terminals and leads from current collectors 104, 112 to the respective terminal. Although battery 100 is illustrated as a single cell battery, similar principles may be applied to an assembly that includes more than one cell within a battery and/or more than one battery (e.g., battery packs, etc.). Such multiple-battery assemblies should be understood to fall within the scope of the present disclosure.

Housing 102 can include any suitable material. Generally, housing 102 encapsulates battery components 104-114 from the environment. By way of examples, housing can include metal, a foil pouch, a polymeric film, or the like.

Suitable current collectors for cathode current collector 104 and anode current collector 112 include conductive material. By way of examples, cathode current collector can be or include aluminum, a form of aluminum, aluminum alloy, nickel, a form of nickel, nickel alloy, duplex steel, stainless steel, titanium, a form of titanium, titanium alloy; the anode current collector can be or include copper, a copper oxide, a copper alloy, nickel, a nickel oxide, a nickel alloy, duplex steel, stainless steel, silver, a silver alloy. Additionally, or alternatively, either current collector can be or include at least one material selected from the group consisting of molybdenum, titanium, zirconium, and combinations thereof. The current collector can be in contact with a compound comprising at least one halogen atom, such as $Li_6PS_5Cl$, and/or one sulfur atom, such as $Li_{10}GeP_2S_{12}$. The compound may be an electrolyte and/or an electrode (anode and/or cathode) material. The current collector may be perforated, wherein the pore size may be about 500 nm or above (e.g., about 500 nm to about 5 mm) and the distance between pores can be about 10 μm or more (e.g., about 10 μm to about 10 mm).

Cathode material 106 can include, for example, a form of sulfur, a sulfide, an oxide, an organic material, a form of halogen, a halide. The cathode material can be mixed with electrolyte material and applied to the cathode current collector. A cathode includes the cathode material.

Anode material 110 can include anode active materials, such as, for example, lithium, sodium, potassium, magnesium, calcium, vanadium, aluminum, zinc, silicon, graphite, graphene, porous carbon, activated carbon, a silicon compound, a metal oxide and combinations thereof. The anode active material can be mixed with electrolyte material and disposed on or over the anode current collector. In some cases, a battery can include a substrate (e.g., a current collector) that does not initially include any anode active material. The anode active material can deposit onto or be intercalated with the substrate during initial charging of the battery. Anode material can additionally include electrolyte material as described herein. An anode includes the anode material. In some cases, a battery in accordance with examples of the disclosure does not include an anode. In these cases, the electrolyte can be positioned in the cathode and between an anode current collector and the cathode.

Electrolyte 108 is a solid-state electrolyte. In accordance with examples of the disclosure, electrolyte 108 includes one or more of polymers, glass, phosphates, fluorophosphates, carbonates, amines, borates, fluoroborates, halides, halates, oxohalides, oxides, such as $SiO_2$, $TiO_2$, $Al_2O_3$, $Y_2O_3$, $Mg_2B_2O_5$, $Li_2O$, $LiOH$, $Li_2O_2$, $Li_2CO_3$, $P_2O_5$, $GeO_2$, $AlPO_4$, $Li_2Ti_3O_7$, perovskites, antiperovskites, such as $Li_3OBr$, $Li_3OCl$, $Li_2OHBr$, $Li_2OHCl$, LISICON-type electrolytes, such as $Li_{1+x}Al_xTi_{2-x}(PO_4)_3$, $Li_{2+2x}Zn_{1-x}GeO_4$, $Li_{(3+x)}Ge_xV_{(1-x)}O_4$, $Li_{(4-x)}Si_{(1-x)}P_xO_4$, $Li_{1+x+y}Al_{2-x}Ti_{2-x}Si_yP_{3-y}O_{12}$, $Li_{7-x}Al_xGe_yTi_{2-x-y}P_3O_{12}$, $Li_{1+x+3y}Al_x(Ge, Ti)_{2-x}(Si_yPO_4)_3$, $Li_{14}ZnGe_4O_{16}$, $Li_{4-x}V_xGe_xO_4$, garnets, such as $Li_7La_3Zr_2O_{12}$, $Li_{7-x}La_3Zr_{2-x}Nb_xO_{12}$, $Li_7La_{3-x}Ca_xZr_{2-x}Nb_xO_{12}$, $Li_{6+x}La_3Zr_{1+x}Ta_{1-x}O_{12}$ sulfides, such as $Li_6PS_5Cl$, $Li_{9.54}Si_{1.74}P_{1.44}S_{11.7}Cl_{0.3}$, $Li_{10}GeP_2S_{12}$, $Li_7PS_6$, $Li_{3.25}P_3S_{11}$, $Li_{3.25}P_{0.95}S_4$, $Li_{3+x}Ge_xP_{1-x}S_4$, thio-LISICON type electrolytes, such as $Li_{(4-x)}Ge_{(1-x)}P_xS_4$, oxynitrides, nitrides or the like. The electrolyte may be larger in its width and length than the current collector to avoid contact between the anode and the cathode.

As set forth in more detail below, in accordance with examples of the disclosure, one or more electrodes and/or an electrolyte includes an electrosprayed organic or polymeric material. The organic/polymeric (sometimes referred to simply as polymeric) material can have an ionic conductivity of greater than 0 and less than $10^{-6}$ S/cm or $10^{-7}$ S/cm and a weight percentage of the polymeric material over the electrolyte greater than zero and less than 5 wt % of the combined weight of the polymeric material and the electrolyte.

A cathode and an anode may also include the electrosprayed organic/polymeric material. A battery may also include a plasticizer, such as a plasticizer described herein, as part of an electrode and/or electrolyte.

Gas 114 can include inert or non-inert gas. In accordance with examples of the disclosure, the non-inert gas is not used as an active material. The non-inert gas can be consumed or dissolved to less than 0.01 mg per 1 mAh on average during the full lifecycle of the battery. As used herein, the term "full lifecycle of the battery" is intended to mean that the life of the battery is considered to have exceeded its normal useful life, which can be the point at which the battery shows 80% of its original capacity for the first time. Gas 114 can be in contact with the anode active material, the cathode active material, and/or the electrolyte.

Battery 100 can be formed as in button cells, alternating plates, in jelly rolls, in prismatic cells, in flow cells, or the like.

Figure 2:
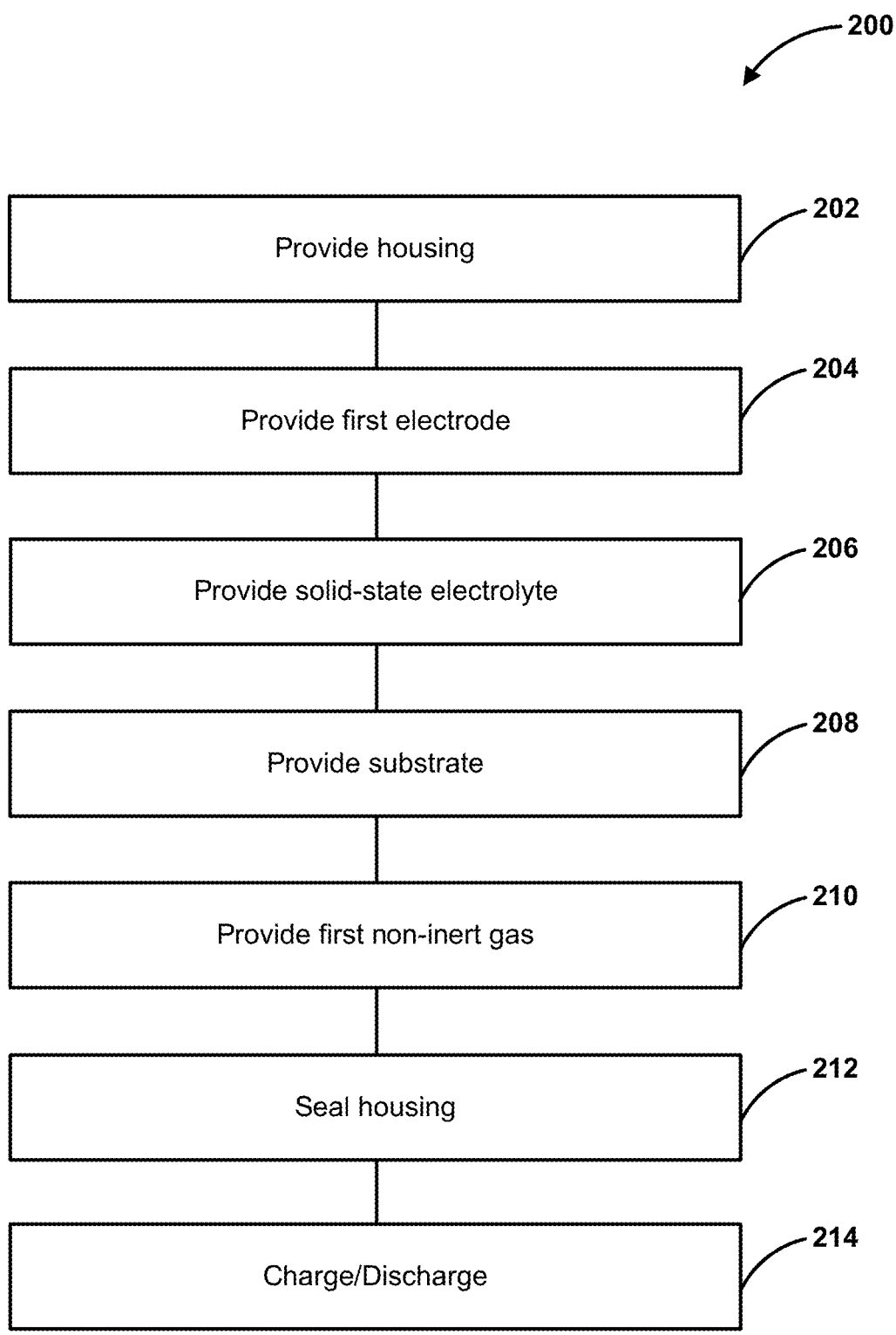
FIG. 2 illustrates a method according to at least one embodiment of the disclosure.

FIG. 2 illustrates a method 200 in accordance with additional examples of the disclosure. Method 200 includes the steps of providing a housing (202), providing a first electrode within the housing (204), providing a solid-state electrolyte in contact with the first electrode and within the housing (206), providing a substrate within the housing (208), providing a first non-inert gas to the housing to displace ambient gas within the housing (step 210), sealing the housing (step 212), and performing at least one charge and/or discharge cycle (step 214). Unless otherwise noted, steps of method 200 need not necessarily be performed in the order illustrated. For example, step 212 can be performed before step 210 and/or the order of steps 204 and steps 208 can be reversed. Other sequences are also possible. Further, exemplary methods need not include all of the illustrated steps and/or can include additional steps.

During step 202, a housing, such as housing 102 is provided.

During step 204, a first electrode (e.g., cathode) is provided. The first electrode can be an anode or a cathode. The first electrode can include electrode active material. The first electrode can include electrolyte material. In some cases, step 204 can also include providing a current collector.

During step 206, a solid-state electrolyte is provided. The solid-state electrolyte can be, for example, electrolyte 108.

During step 208, a substrate, such as a current collector, is provided. In some cases, step 208 can also include providing an electroactive electrode (e.g., anode) material. In some cases, step 208 does not include initially providing electroactive electrode material.

During step 210, a (e.g., first) non-inert gas is provided to the housing to displace ambient gas within the housing. The non-inert gas can include at least one oxygen. By way of examples, the non-inert gas can comprise one or more of $CO_2$, $CO$, $O_2$, $N_2O$, $NO_2$, and $SO_2$. The non-inert gas can be in contact with the electrodes and the electrolyte.

During step 212, the battery components (e.g., the electrodes, electrolyte, current collectors, and the like) are encapsulated. Once encapsulated, gases can be added or evacuated from within the housing—e.g., through one or more ports 116, 118, illustrated in FIG. 1.

During step 214, at least one discharge and/or at least one charge step is performed. Step 214 can be performed in the presence of the non-inert gas provided during step 210 and/or an inert gas. A charge and/or discharge current density can be greater than 0 and less than 0.1 mA/cm$^2$ during step 214.

FIGS. 3-7 illustrate various methods 300-700 that are variations of method 200. Each method 300-700 includes at least one step of providing a non-inert gas. In addition to other advantages noted herein, use of the non-inert gas can prolong a cycle life of a cell, while mitigating any fire hazard associated with the use.

Figure 3:
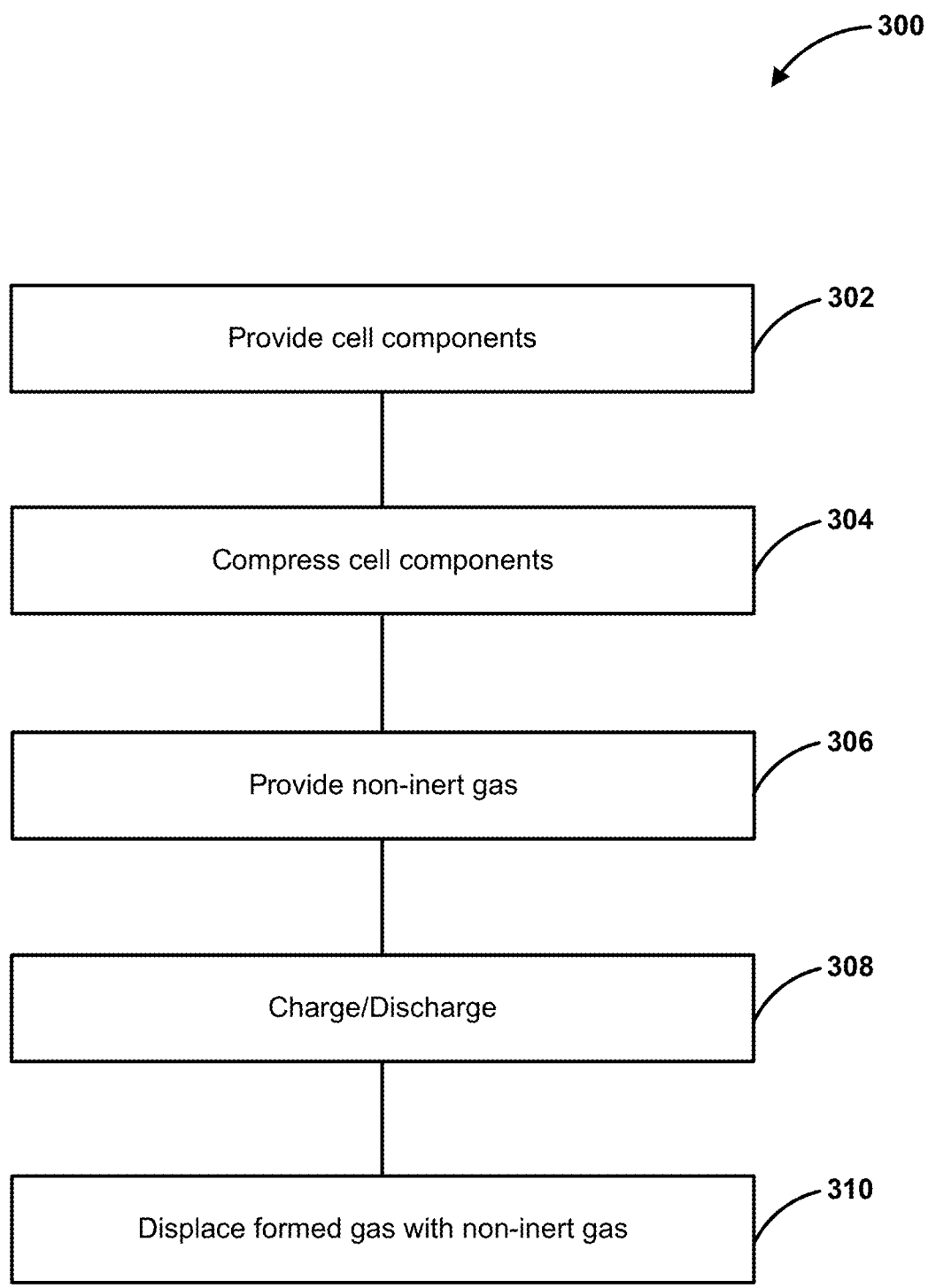
FIGS. 3-7 illustrate exemplary methods of fabricating a battery according to exemplary embodiments of the disclosure.
Figure 4:
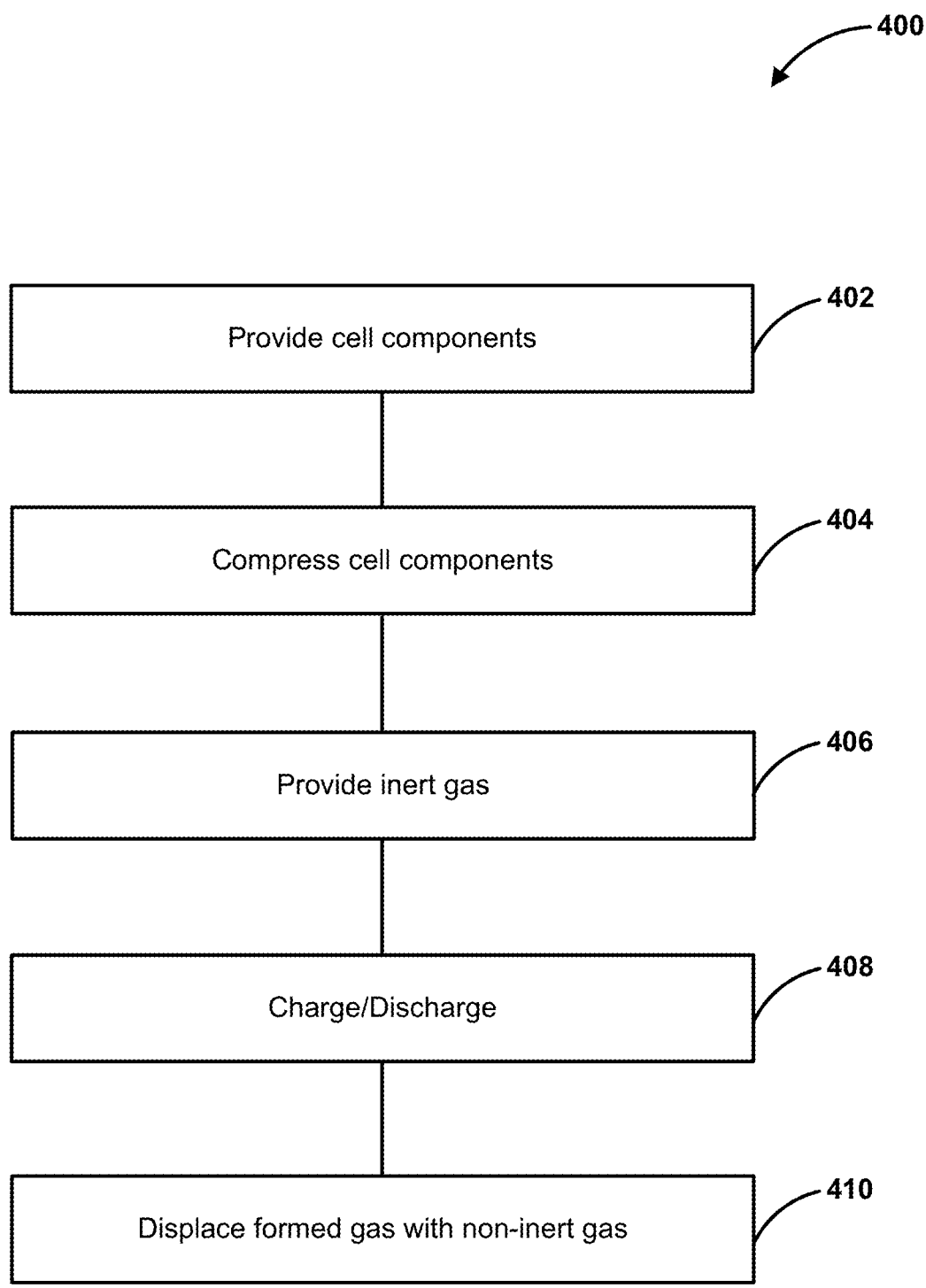
Figure 5:
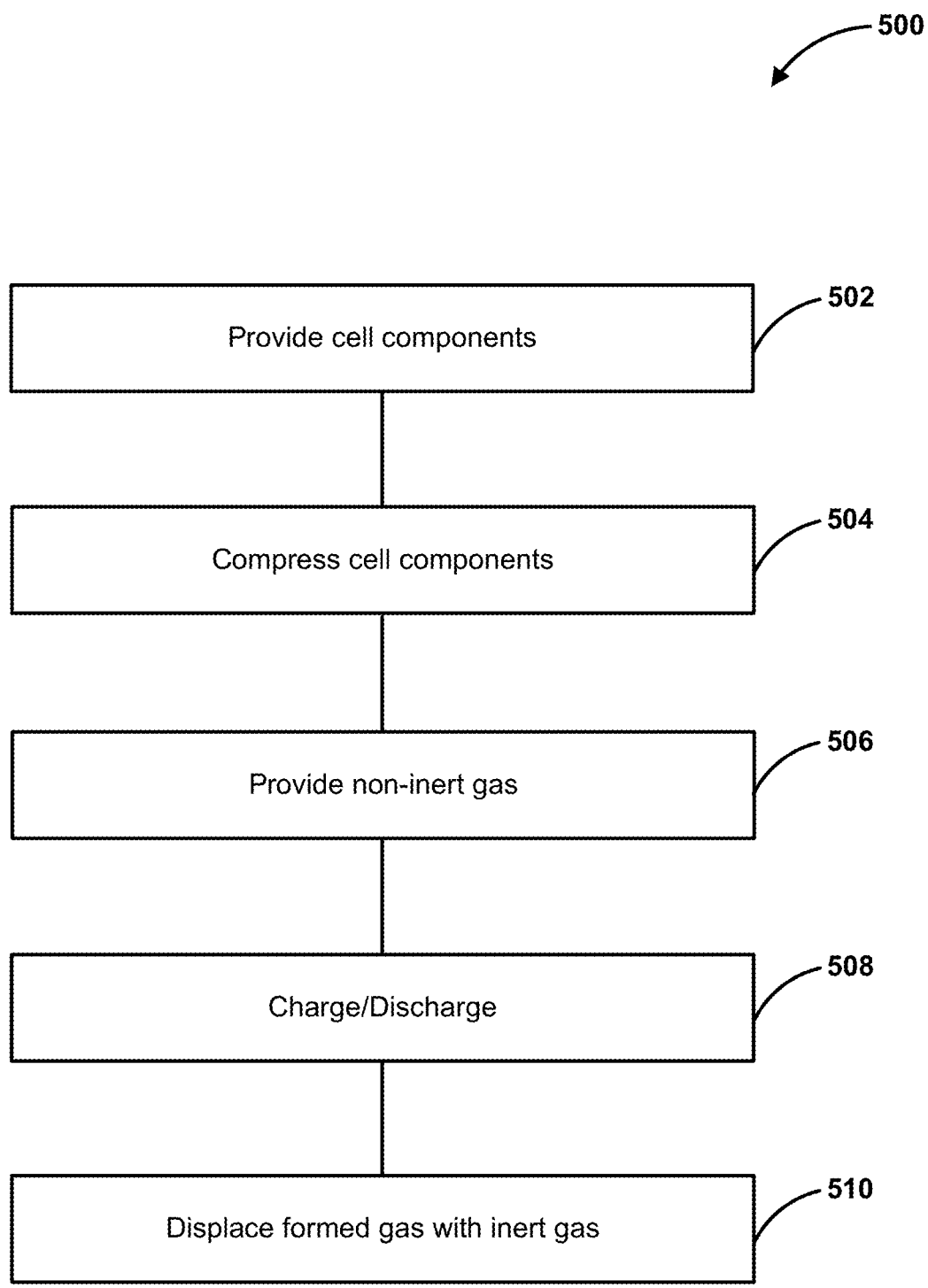
Figure 6:
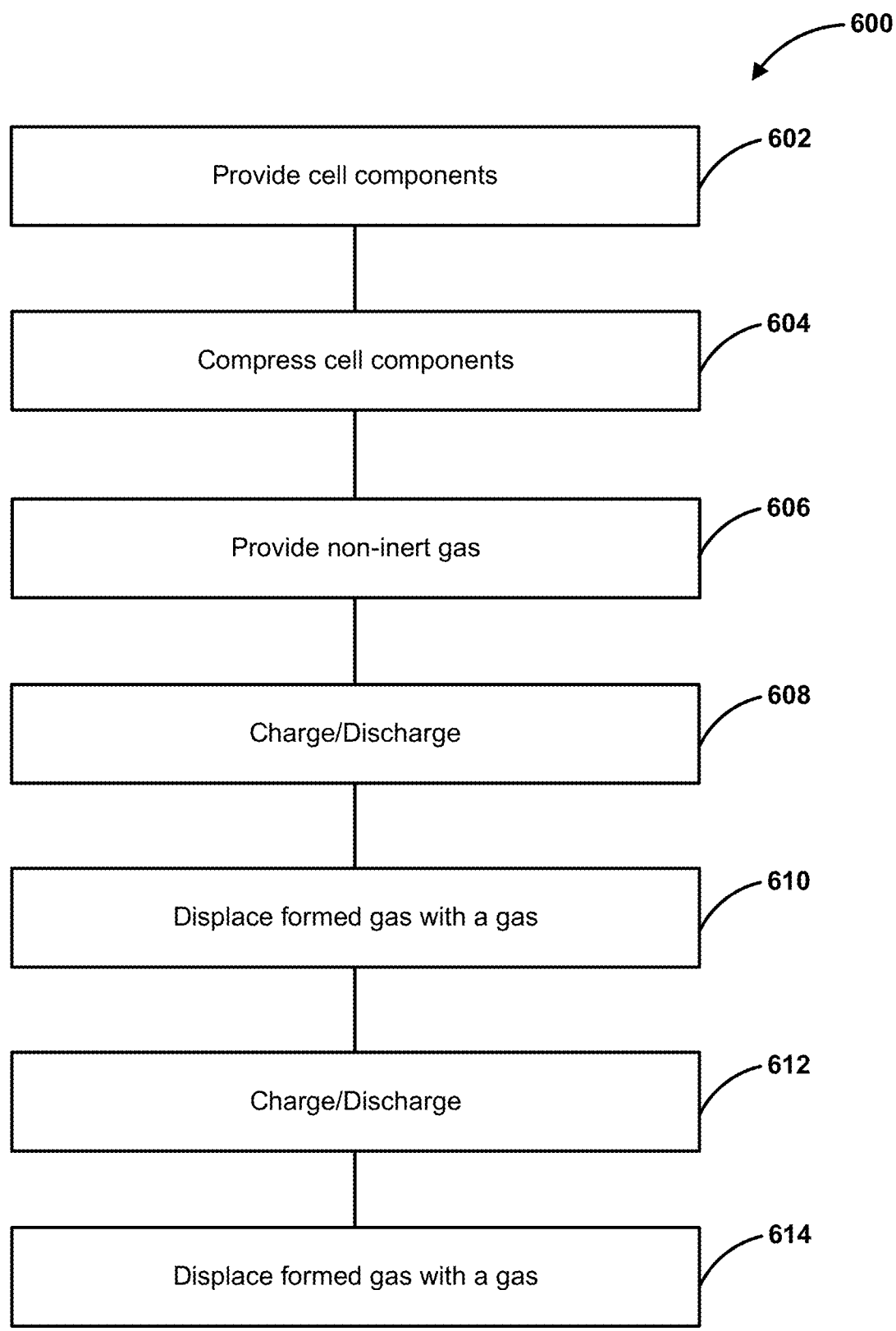

FIG. 3 illustrates a method 300, which includes steps of providing cell components (step 302), compressing the cell components (step 304), providing a non-inert gas (step 306), performing at least one charge/discharge cycle (step 308), and displacing formed gas with a non-inert gas (step 310).

During step 302, cell components, such as a housing, anode, cathode, and electrolyte, such as those described herein, are provided.

Figure 13:
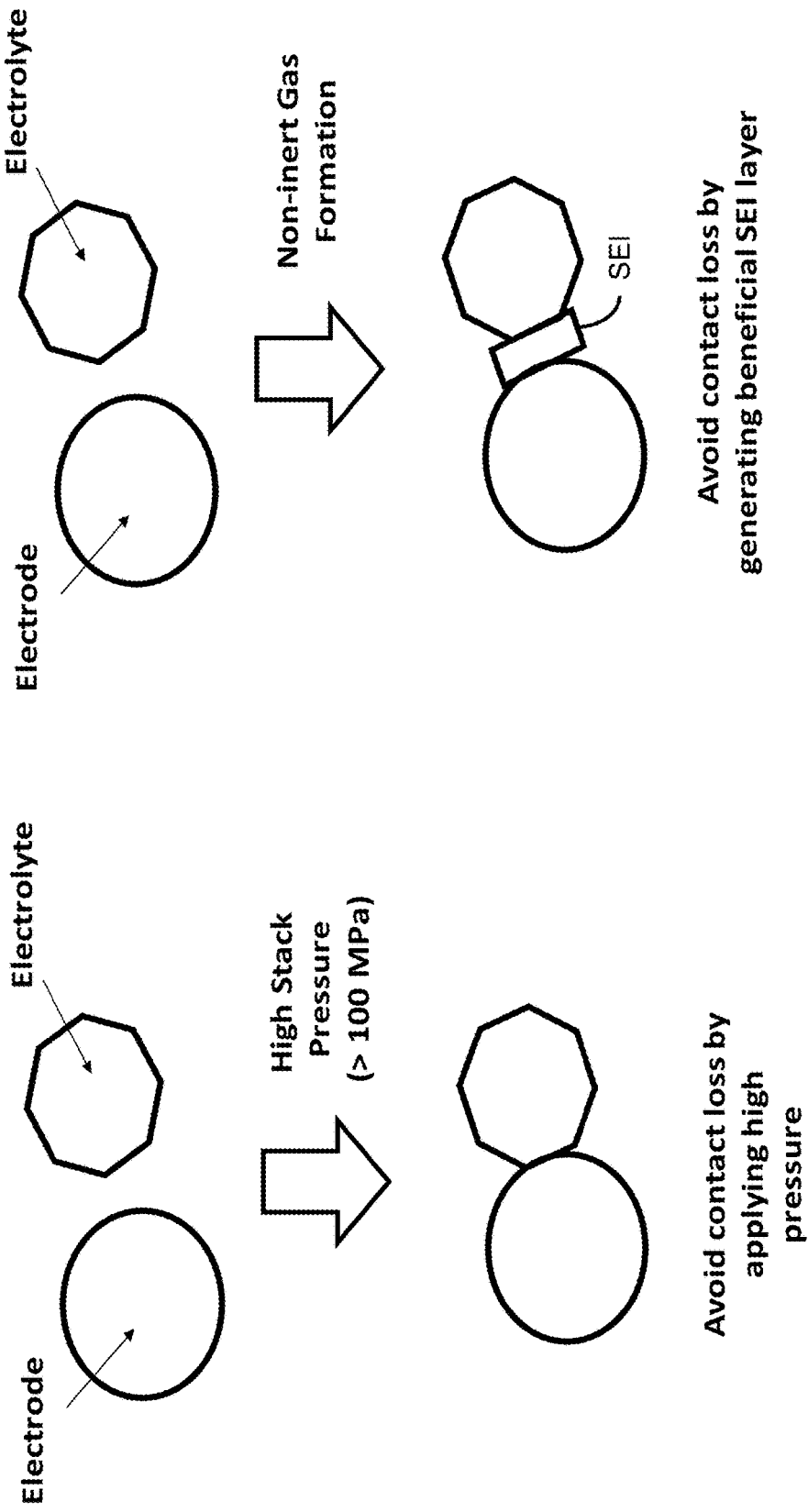
FIG. 13 illustrates formation of a solid electrolyte interface using a non-inert gas in accordance with examples of the disclosure.

During step 304, the cell components are compressed. The cell components can be compressed using, for example, a press, with a fabrication pressure of around 5 MPa or below (e.g., about 0.5 MPa to about 500 MPa). Step 304 can be used to facilitate desired contact between the electrolyte, anode material, and cathode material. During step 304, an amount of pressure applied to the cell can be controlled in order for the anode and the cathode to be demarcated. Advantageously, a pressure applied during step 304 and during similar steps described herein, can be lower than a pressure typically applied to an electrochemical cell during manufacture of the cell. Typical pressures are greater than 100 MPa. FIG. 13 illustrates formation of an SEI between electrolyte material and electrode material. It is thought that formation of the SEI using the non-inert gas mitigates contact loss between the electrolyte material and the electrode material, without use of higher pressures (e.g., above 5 or 10 MPa), as noted herein.

During step 306, a (e.g., first) non-inert gas is provided within the housing provided during step 302. The non-inert gas can be a non-inert gas as described herein. The non-inert gas can be used to replace ambient gas that was contained or encapsulated within the housing. The use of non-inert gas can add electroactive functional groups on the surface of the electrode materials and/or redesign the chemical structure of the electrode materials that may contribute to storing more energy per a unit mass or area of the electrode and/or can be used to form a solid electrolyte interface (SEI) layer during step 308.

The housing can be sealed before or after step 306. If before, the non-inert gas can be introduced and the ambient gas can exit through ports within the housing, such as ports described herein.

During step 308, at least one discharge and/or at least one charge cycle is performed. During step 308, a SEI can form between at least one electrode and the electrolyte. For example, the SEI can form between the cathode and the solid electrolyte and/or between the anode and the solid electrolyte—e.g., on one or more of the anode, the cathode, and the electrolyte. The SEI layer is thought to lower the interfacial and/or charge transfer resistance. The charging and/or discharging of the battery may be done at a current density of greater than 0 and less than 0.1 mA/cm$^2$.

A number of charge and/or discharge steps can vary according to anode materials, the non-inert gas, and the like. By way of examples, about 1 to about 10, or about 2 to about 50, or about 3 to about 100 charge and/or discharge cycles are performed during step 308. Similar numbers of charge/discharge steps can be performed during other methods described herein.

During step 310, a pressure within the housing can be reduced (e.g., to about standard atmospheric pressure, 1 bar) and gas formed during step 208 can be purged using a non-inert gas. It is to be understood that not all gas within the housing may or need be purged during this step. The non-inert gas used during step 310 can be the same or different than the non-inert gas used during step 306. After step 310, the battery is ready for use.

Method 400 includes the steps of providing cell components (step 402), compressing the cell components (step 404), providing an inert gas (step 406), performing at least one charge/discharge cycle (step 408), and displacing formed gas with a non-inert gas (step 410).

Steps 402, 404, 408, and 410 can be the same or similar to steps 302, 204, 308, and 310 described above. Method 400 differs from method 300 at step 306/406. In method 400, an inert gas is provided within the housing during step 406. The cell is then cycled during step 408, and the housing is purged with a non-inert gas during step 410.

Method 500 is also similar to method 300. Method 500 includes the steps of providing cell components (step 502), compressing the cell components (step 504), providing a non-inert gas (step 506), performing at least one charge/discharge cycle (step 508), and displacing formed gas with a gas (step 510).

Steps 502-508 can be the same or similar to steps 302-308 described above. Method 500 differs from method 300 at step 510/310. In method 500, an inert gas is provided within the housing during step 510 to purge the housing. In contrast, in method 300, a non-inert gas is used to purge the housing.

Method 600 is also similar to method 300, except method 600 includes additional steps 612 and 614, and steps 610 and 614 can include providing an inert and/or non-inert gas. As illustrated, method 600 includes the steps of providing cell components (step 602), compressing the cell components (step 604), providing a non-inert gas (step 606), performing at least one charge/discharge cycle (step 608), displacing formed gas with a gas (step 610), performing at least one additional charge/discharge cycle (612), and displacing formed gas (during step 612) with a gas (step 614). In an alternative method, step 606 can include providing an inert gas.

Steps 602-608 can be the same or similar to steps 302-308 described above. During step 610, an inert and/or a non-inert gas can be provided to the housing to displace gas formed during step 608. The inert and/or non-inert gas can be as described herein.

Step 612 can be the same or similar to step 608. For example, step 612 can include at least one discharge and/or at least one charge cycle at a current density of greater than 0 and less than 0.1 mA/cm$^2$. The charging/discharging can be repeated as described herein.

Finally, during step 614, the housing can be purged with gas that includes a non-inert or inert gas as described herein. Step 614 can be, for example, the same or similar to step 310 or 510. The gas used in steps 610 and 614 can be the same or different. By way of example, a gas used during step 610 can be a non-inert gas, and a gas used during step 614 can be an inert gas.

Figure 7:
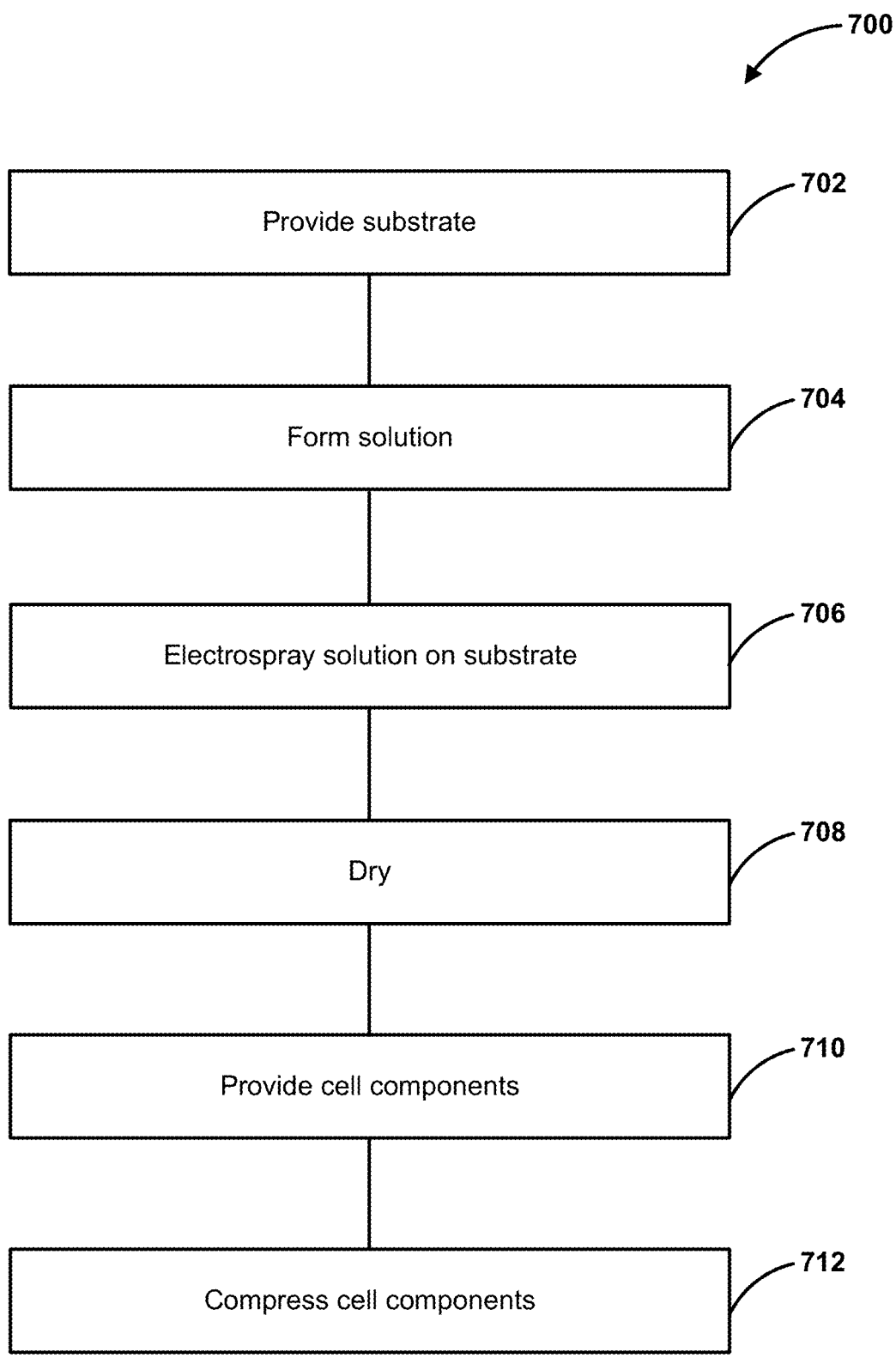

FIG. 7 is a flow chart of a method of fabricating an electrochemical cell 700 according to another exemplary embodiment. Method 700 includes the steps of providing a substrate (step 702), forming a solution (step 703), electrospraying the solution onto the substrate (step 706), drying the solution (step 708), providing cell components (step 710), and compressing the cell components (step 712).

Step 702 includes providing a substrate onto which a solution will be electrosprayed. Exemplary substrates can include a current collector, an electrode, an electrolyte, or any combination thereof. Byway of example, the substrate can include an electrolyte and optionally an electrode and/or current collector.

During step 704, a solution comprising polymeric material is formed. The solution can include the polymeric material and a suitable solvent. Exemplary solvents include one or more of methanol, ethanol, chloroform, toluene, ethyl acetate, acetonitrile, n-propanol, acetone, N,N-dimethylformamide, isopropanol, 1,4-dioxane, dimethyl sulfoxide, N,N-dimethylacetamide, tetrahydrofuran, 1,1,1,3,3,3-hexafluoro-2-propanol, 1,2-dimethoxyethane, N-methyl-2-pyrrolidinone, N-methylimidazole, carbon disulfide, ethyl formate, 3-methoxypropionitrile, oxalic acid, trichloroacetic acid, trifluoroacetic acid, acetic acid, cyclohexane, diethyl ether, nitromethane, pyridine, water, in any combination. The polymeric material can be non or low ion-conducting (e.g., conductivity of more than 0 and less than <10$^{-7}$ S/cm) and can form part of the electrolyte and/or an electrode. The polymeric material can include, for example, one or more of polycaprolactone, poly acrylic acid, poly methyl methacrylate, polytetrafluoroethylene, poly vinylidene fluoride, polyacrylonitrile, polyethylene terephthalate, polyvinylpyrrolidone, and poly(4-vinylpyridine), in any combination. A concentration of the polymeric material in solution can be between about 0.01 wt. % and about 10 wt. % or about 0.1 wt. % and about 5 wt. %.

During step 706, the solution formed during step 704 can be electrosprayed onto the substrate provided during step 702.

During step 706, one or more electrospraying parameters, such as flow rate, applied voltage, applied current, nozzle dimension, nozzle type, distance between the tip of the nozzle and the current collector, and the like can be adjusted. The electrospraying process can advantageously allow for the elongation and the thinning of the (e.g., non or low ion-conducting) polymeric material, which may not only strongly bind the electrolyte materials to fabricate microns thick freestanding film (e.g., >5 μm) without cracking, but also can cover a surface of the electrolyte materials with a relatively small amount of the non or low ion-conducting polymeric material, compared to traditional application techniques. A benefit of having an elongated thin (e.g., nanolayer) of the non or low ion-conducting polymeric material on the surface of the electrolyte material is in its role of chemically suppressing dendritic growth from the anode, while maintaining the ionic conductivity of the electrolyte.

During step 708, the solution applied during step 706 is dried. Step 708 can be performed in a lower pressure (e.g., about 0.1 MPa to about 10 MPa) and/or in an inert gas atmosphere.

During step 710, cell components—e.g., current collectors, one or more electrodes and an electrolyte are provided within a housing. Step 710 can be the same or similar to step 302.

During step 712, the cell components are compressed. Step 712 can be the same or similar to step 304. Thereafter, a method of forming a battery can include additional steps, such as steps 306-310, 406-410, 506-510, or 606-614. The use of the electrospraying process can be used in conjunction with any of the methods discussed in connection with any of methods 300-600.

Figure 8:
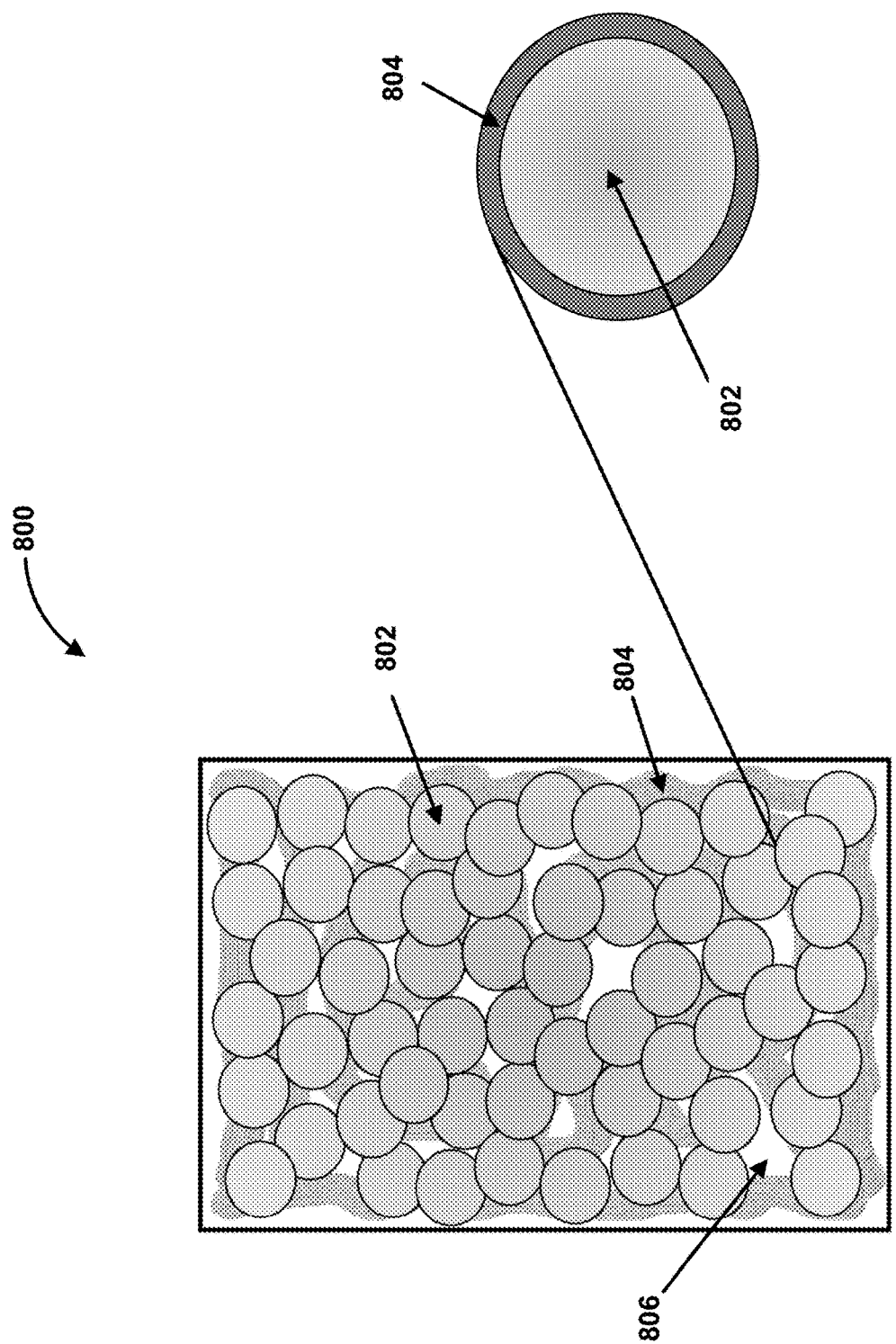
FIG. 8 illustrates a solid-state electrolyte according to an exemplary embodiment of the disclosure.

FIG. 8 illustrates a solid (also referred to herein as solid-state) electrolyte 800 according to an exemplary embodiment. Solid electrolyte 800 can include solid-electrolyte particles 802 at least partially coated with polymeric material 804. The solid electrolyte can be positioned in and between the anode and the cathode. Solid electrolyte 800 can also be in contact with a non-inert gas 806—e.g., comprising at least one oxygen atom. A thickness of the polymeric material on the surface of solid electrolyte may be greater than 0 and less than 100 nm or be between about 1 and about 50 nm. The polymeric material may be absent when the solid electrolyte is in contact with the electrode material.

Figure 9:
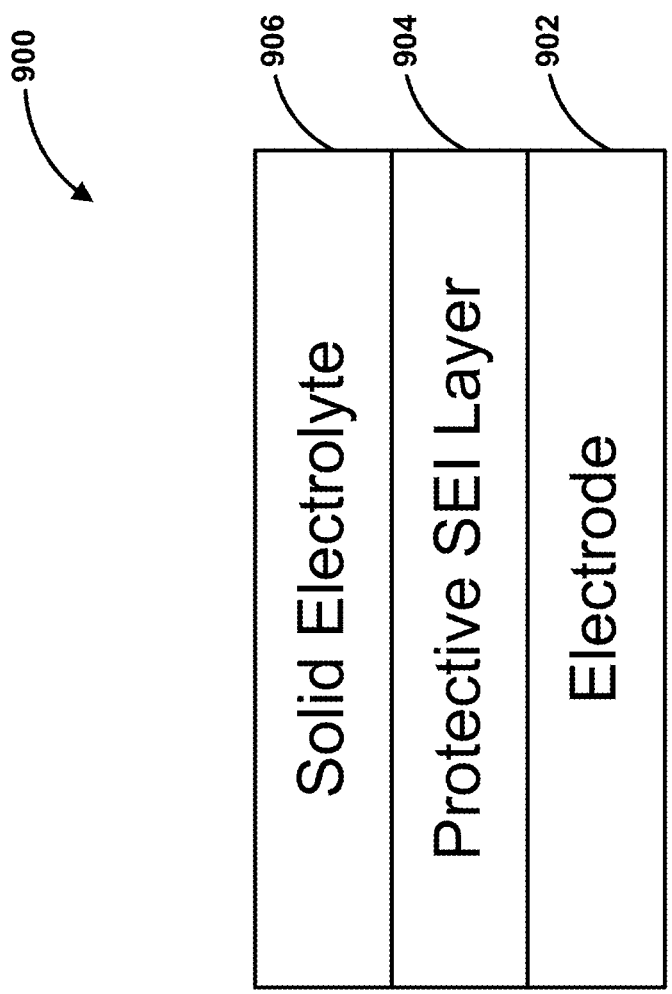
FIG. 9 illustrates a structure including solid electrolyte interphase electrochemically produced by a non-inert gas according to an exemplary embodiment of the disclosure.

FIG. 9 is a schematic illustration of a structure 900, including an electrode (e.g., an anode or a cathode) 902, a protective solid electrolyte interphase (SEI) layer 904 (e.g., electrochemically produced by a non-inert gas as described above), and a solid electrolyte 906 according to exemplary embodiments. The SEI layer can be formed between solid electrolyte 906 and electrode 902 when the battery comprising the electrolyte, the electrode, and the non-inert gas is charged and/or discharged. The SEI layer can include a compound comprising at least one oxygen atom. A thickness of the SEI layer may be greater than 0 and less than 100 nm. The SEI layer can lower ionic resistance and interfacial resistance between electrode 902 and electrolyte 906.

Figure 10:
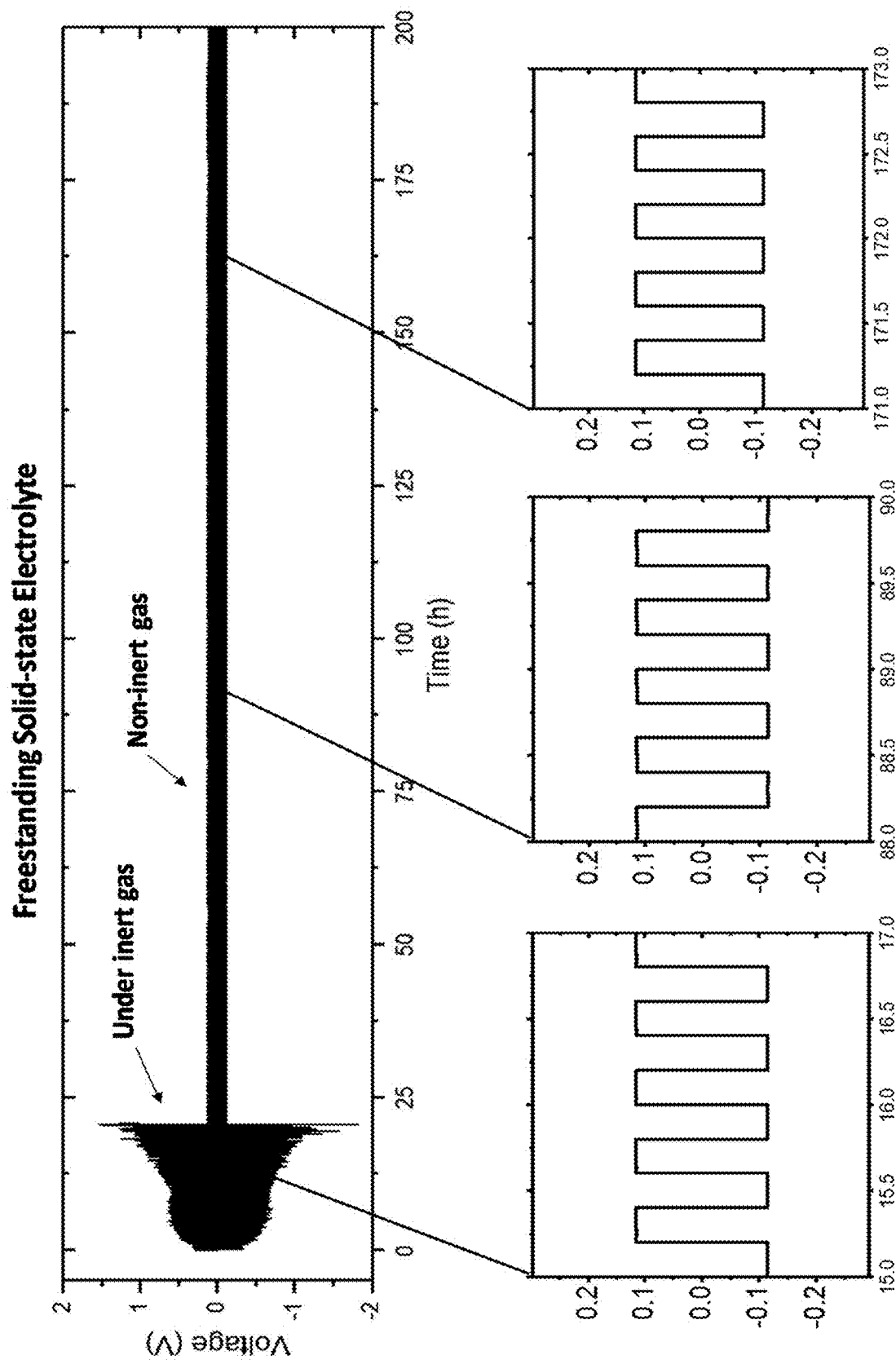
FIG. 10 is a graph illustrating stable cycle performance of a symmetrical cell comprising solid-state electrolyte preformed under a non-inert gas, compared to performance of the cell under an inert gas.

FIG. 10 is a graph illustrating stable cycle performance of a symmetrical cell comprising a solid electrolyte preformed under a non-inert gas (e.g., carbon dioxide) compared to that under an inert gas (e.g., argon). The battery formed according to examples of the disclosure (e.g., comprising lithium metal foils, the solid electrolyte, and carbon dioxide gas) showed superior cycle performance over 2,000 cycles and 500 hours at a current density of 5 mA/cm$^2$, whereas a battery comprising the lithium metal foils, the solid electrolyte, and inert/argon gas showed disruption at around 100 cycles under 24 hours. The solid electrolyte film was positioned between two lithium metal foils. $Li_{1.3}Al_{0.3}Ti_{1.7}(PO_4)_3$ (LATP), a lithium superionic conductor (LiSICON) structure was selected as the solid electrolyte material. The solid electrolyte film was freestanding and fabricated via electrospraying the solid electrolyte, polycaprolactone and poly (ethylene oxide). The weight ratio of the electrolyte film comprising the solid electrolyte, polycaprolactone, and poly (ethylene oxide) was 95:1:4. The thickness of the electrolyte film was about 35 μm. The cell stack pressure was measured to be around 9 MPa. The polycaprolactone was chosen as the non- or low-ion conducting polymeric material. The polycaprolactone was electrosprayed in the outer region of the co-axial nozzle wherein the solid electrolyte and poly (ethylene oxide) blend was electrosprayed in the core region, in an effort to coat the solid electrolyte and poly (ethylene oxide) blend with an ultrathin nanofilm comprising the polycaprolactone.

Figure 11:
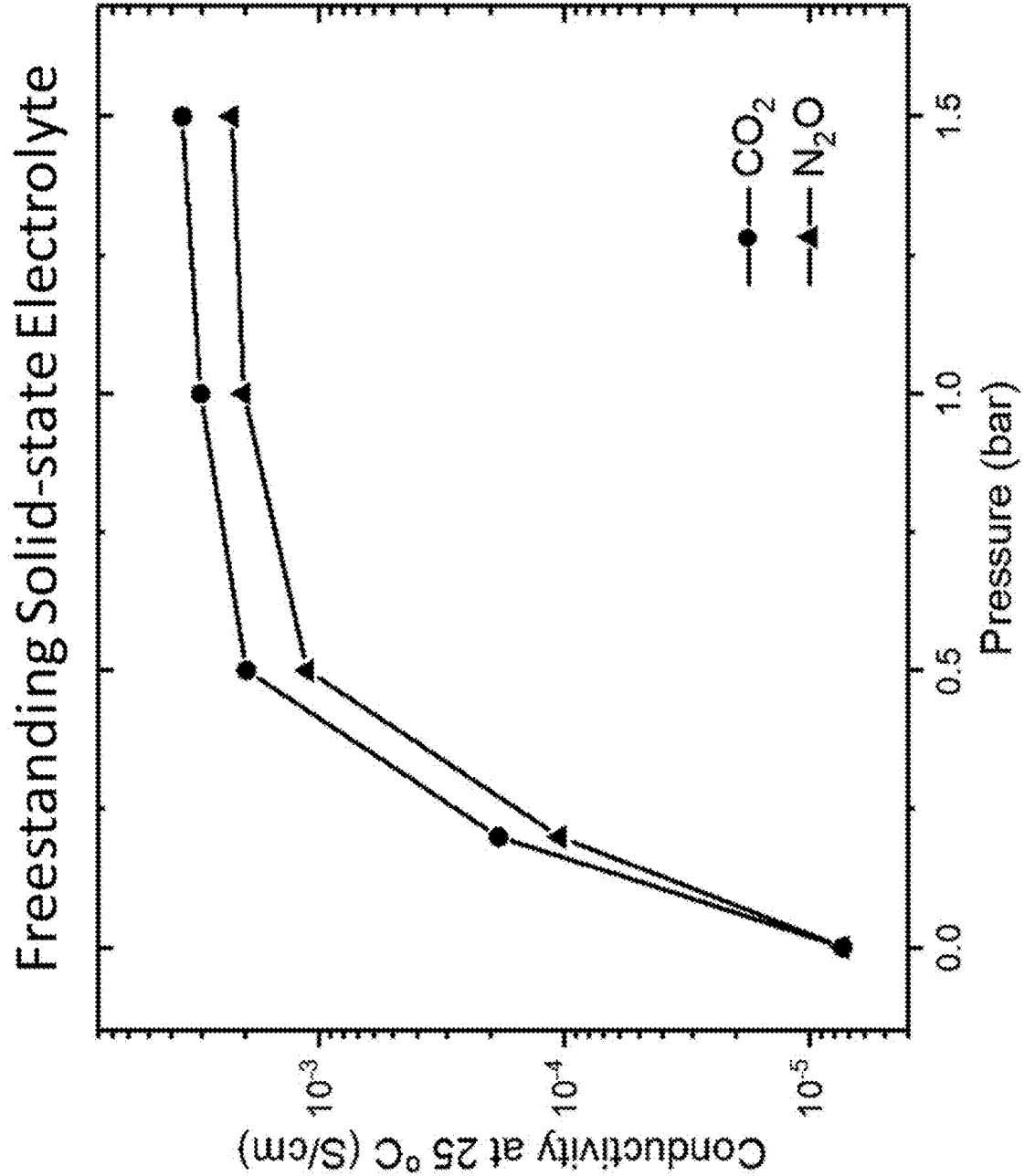
FIG. 11 is a graph illustrating improvement in ionic conductivities of the preformed electrolyte under different partial pressure of various non-inert gases.

FIG. 11 is a graph illustrating improvement in interfacial ionic conductivities of the batteries comprising the lithium metal foil and the solid electrolyte preformed under different partial pressure of non-inert gases. The conductivities were measured after 10 charging and discharging cycles at a current density of 0.01 mA/cm$^2$. The solid electrolyte film was positioned between two lithium metal foils. $Li_{1.3}Al_{0.3}Ti_{1.7}(PO_4)_3$ (LATP), a lithium superionic conductor (LISICON) structure was selected as the solid electrolyte material. The solid electrolyte film was freestanding and fabricated via electrospraying the solid electrolyte, polycaprolactone and poly (ethylene oxide). The weight ratio of the electrolyte film comprising the solid electrolyte, polycaprolactone, and poly (ethylene oxide) was 95:1:4. Electrolytes or electrolyte films in accordance with the disclosure can include at least 70 wt % electrolyte material, up to 10 wt % non or low conductive polymeric material, such as polycaprolactone, and up to 10 wt % conductive polymeric material, such as poly (ethylene oxide). The thickness of the electrolyte film was about 35 μm. The cell stack pressure was measured to be around 9 MPa. The polycaprolactone was chosen as the non- or low-ion conducting polymeric material. The polycaprolactone was electrosprayed in the outer region of the co-axial nozzle wherein the solid electrolyte and poly (ethylene oxide) blend was electrosprayed in the core region. Nitrous oxide and carbon dioxide were selected as the non-inert gases. The higher partial pressure of the non-inert gases shows the higher conductivity of the electrolyte at 25° C. The conductivities at 25° C. reached above $10_{-3}$ S/cm under all gases. The conductivity at 25° C. under argon gas was measured at around $7\times10^{-6}$ S/cm.

Figure 12:
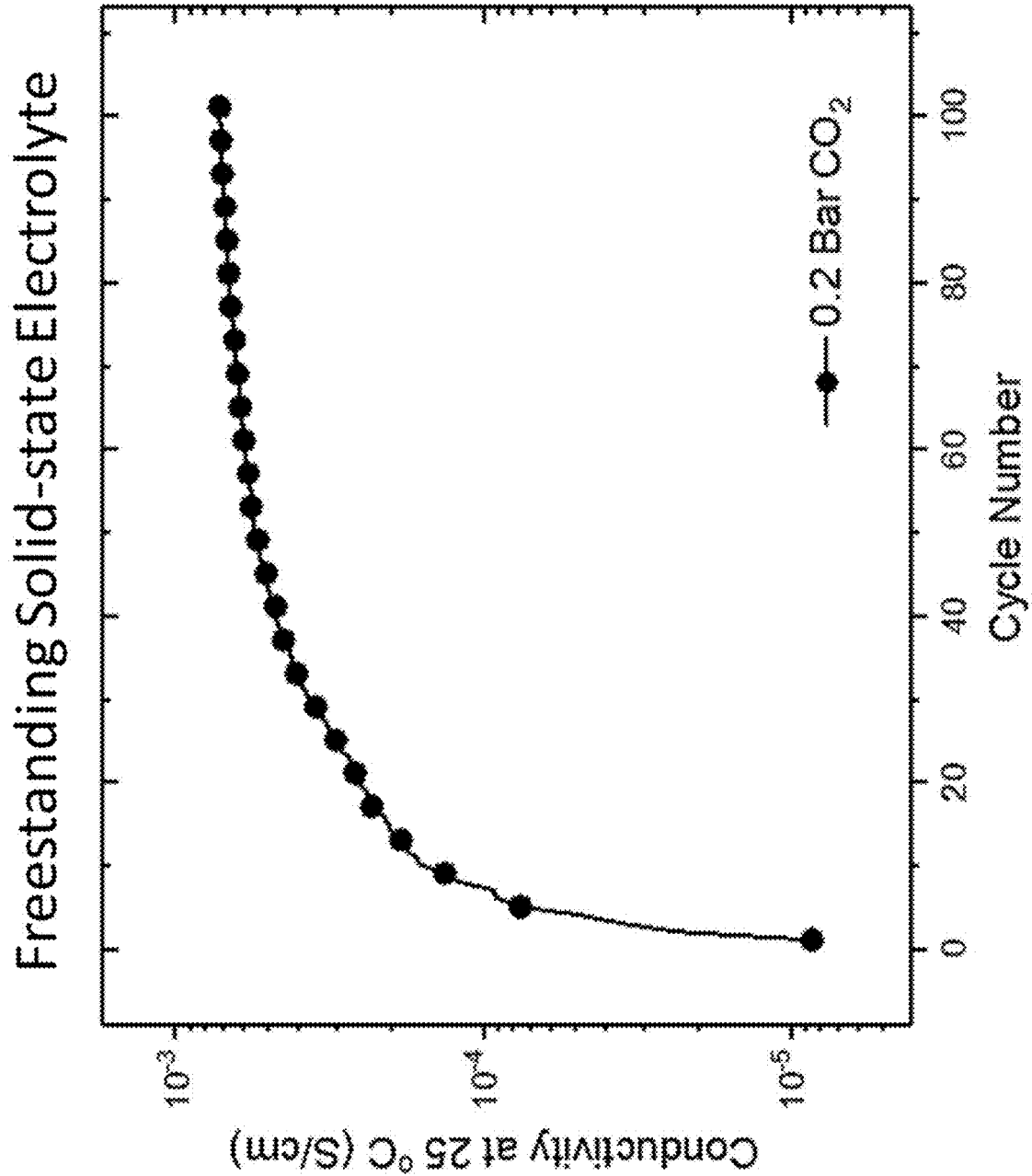
FIG. 12 is a graph illustrating ionic conductivities of the batteries in accordance with examples of the disclosure.

FIG. 12 is a graph illustrating improvement in interfacial ionic conductivities of the batteries comprising the lithium metal foil and the solid electrolyte under the carbon dioxide partial pressure of 0.2 bar with respect to the cycle number. The conductivities of the battery were measured after each cycle operated at a current density of 0.01 mA/cm$^2$. The solid electrolyte film was positioned between two lithium metal foils. $Li_{1.3}Al_{0.3}Ti_{1.7}(PO_4)_3$ (LATP), a lithium superionic conductor (LiSICON) structure was selected as the solid electrolyte material. The solid electrolyte film was freestanding and fabricated via electrospraying the solid electrolyte, polycaprolactone and poly (ethylene oxide). The weight ratio of the electrolyte film comprising the solid electrolyte, polycaprolactone, and poly (ethylene oxide) was 95:1:4. The thickness of the electrolyte film was about 35 μm. The cell stack pressure was measured to be around 9 MPa. The polycaprolactone was chosen as the non- or low-ion conducting polymeric material. The polycaprolactone was electrosprayed in the outer region of the co-axial nozzle wherein the solid electrolyte and poly (ethylene oxide) blend was electrosprayed in the core region. Carbon dioxide was selected as the non-inert gas. The conductivities at 25° C. reached close to $10_{-3}$ S/cm after $100^{th}$ cycle under 0.2 bar of the carbon dioxide partial pressure. The conductivity at 25° C. under argon gas was measured at around $7\times10^{-6}$ S/cm.

The present disclosure has described the use of various features and methods for producing batteries and cells. It should be understood that any combination of such features and methods are within the scope of the present disclosure. For example, an embodiment that describes the use of a halogenated compound for the cathode active material may be modified to be produced under a non-inert gas atmosphere, and such modification is intended to be within the scope of the present disclosure. Other permutations and combinations that utilize one or more of the features/methods described herein are also possible, and such permutations and combinations are also considered part of the present disclosure without enumerating them specifically.

Notwithstanding the embodiments described above and shown in the accompanying drawing figures, various modifications and inclusions to those embodiments are contemplated and considered within the scope of the present disclosure.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

As noted above, although the figures and description may illustrate a specific order of method steps, the order of such steps may differ from what is depicted and described, unless specified differently above. Also, two or more steps may be performed concurrently or with partial concurrence, unless specified differently above. Further, one or more steps can be repeated before a next step.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A method of forming an electrochemical cell, the method comprising the steps of:
providing a housing;
providing a first electrode within the housing;
providing a solid-state electrolyte in contact with the first electrode and within the housing;
providing a first gas to the housing to displace ambient gas within the housing;
sealing the housing;
performing at least one of a charge and a discharge operation of the electrochemical cell under the first gas; and
providing a second gas to the housing to displace at least a portion of the first gas within the housing and to purge at least a portion of gas formed during the step of performing,
wherein the second gas is different from the first gas.

2. The method of claim 1, further comprising a step of forming a solid electrolyte interphase between the solid-state electrolyte and one or more of the first electrode and a second electrode during the step of performing.

3. The method of claim 1, further comprising performing at least one additional one or more steps of charging the electrochemical cell and discharging the electrochemical cell to form a solid electrolyte interphase.

4. The method of claim 3, further comprising a step of providing a third gas to the housing to purge gas formed during the performing at least one additional one or more steps of charging the electrochemical cell and discharging the electrochemical cell, wherein the third gas is different from the second gas.

5. The method of claim 1, wherein one or more of the first gas and the second gas comprise at least one oxygen atom.

6. The method of claim 5, wherein one or more of the first gas and the second gas comprise one or more of $CO_2$, $CO$, $O_2$, $N_2O$, $NO_2$, and $SO_2$.

7. The method of claim 1, wherein the solid-state electrolyte comprises at least one oxygen atom.

8. The method of claim 7, wherein the solid-state electrolyte comprises one or more of $Si_2$, $TiO_2$, $Al_2O_3$, $Y_2O_3$, $Mg_2B_2O_5$, $Li_2O$, $Li_2O_2$, $Li_2CO_3$, $LiOH$, $P_2O_5$, $GeO_2$, $AlPO_4$, $Li_2Ti_3O_7$, $Li_3OBr$, $Li_3OCl$, $Li_2OHBr$, $Li_2HCl$, $Li_{1+x}Al_xTi_{2-x}(PO_4)_3$, $Li_{2+2x}Zn_{1-x}GeO_4$, $Li_{(3+x)}Ge_xV_{(1-x)}O_4$, $Li_{(4-x)}Si_{(1-x)}P_xO_4$, $Li_{1+x+y}Al_xTi_{2-x}Si_yP_{3-y}O_{12}$, $Li_{1+x}Al_xGe_yTi_{2-x-y}P_3O_{12}$, $Li_{1+x+3y}Al_x(Ge,Ti)_{2-x}(Si_yPO_4)_3$, $Li_{14}ZnGe_4O_{16}$, $Li_{4-x}V_xGe_xO_4$, $Li_7La_3Zr_2O_{12}$, $Li_{7-x}La_3Zr_{2-x}Nb_xO_{12}$, $Li_7La_{3-x}Ca_xZr_{2-x}Nb_xO_{12}$, $Li_{6+x}La_3Zr_{1+x}Ta_{1-x}O_{12}$ ($0 \le x \le 1$, $0 \le y \le 1$).

9. The method of claim 1, further comprising a step of electrospraying a solution to form one or more of the first electrode, the electrolyte, and a second electrode.

10. An electrochemical cell formed according to the method of claim 1.

11. The electrochemical cell of claim 10, wherein the first electrode and a second electrode each comprise a current collector, wherein each current collector comprises a metal alloy having at least one material selected from the group consisting of molybdenum, titanium, zirconium, and combinations thereof.

12. A method of forming a solid-state electrochemical cell or portion thereof, the method comprising the steps of:
providing a substrate;
forming a solution comprising polymeric material and solid electrolyte material;
electrospraying the solution onto the substrate;
forming a free-standing, solid-state electrolyte; and
compressing cell components including the free-standing, solid-state electrolyte and an electrode at a stack pressure of less than 100 MPa.

13. The method of claim 12, wherein the stack pressure is less than 10 MPa.

14. The method of claim 12, wherein the free-standing, solid-state electrolyte comprises at least 70 wt. % of the solid electrolyte material.

15. The method of claim 12, further comprising a step of providing a non-inert gas to form a solid electrolyte interphase between a solid-state electrolyte and one or more of a first electrode and a second electrode.

16. The method of claim 1, wherein one or more of the first gas and the second gas comprise at least one sulfur atom.

17. The method of claim 16, wherein one or more of the first gas and the second gas comprise $SO_2$.

18. The method of claim 1, wherein the solid-state electrolyte comprises sulfur.

19. The method of claim 18, wherein the solid-state electrolyte comprises one or more of $Li_6PS_5Cl$, $Li_{9.54}Si_{1.74}P_{1.44}S_{11.7}Cl_{0.3}$, $Li_{10}GeP_2S_{12}$, $Li_7PS_6$, $Li_7P_3S_{11}$, $Li_{3.25}P_{0.95}S_4$, $Li_{3+x}Ge_xP_{1-x}S_4$, $Li_{(4-x)}Ge_{(1-x)}P_xS_4$ ($0 \leq x \leq 1$, $0 \leq y \leq 1$).

20. The method of claim 1, further comprising a step of compressing cell components including the first electrode and the solid-state electrolyte at a reduced stack pressure of less than about 100 MPa.

* * * * *